ns prep-
2,727,020

ISOCYANATOALKYL VINYL ETHERS AND POLYMERS

Sidney Melamed, Philadelphia, and Benjamin F. Aycock, Elkins Park, Pa., assignors to Rohm & Haas Company, Philadelphia, Pa., a corporation of Delaware No Drawing. Application April 10, 1953, Serial No. 348,107

8 Claims. (Cl. 260—80.3)

This invention deals with isocyanatoalkyl vinyl ethers of the structure

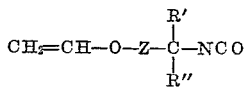

wherein Z is an alkylene group of one to seven carbon atoms, R' and R" being alkyl groups when Z is a chain of not over two carbons atoms, and when Z is a chain of more than two carbon atoms, R' and R" are hydrogen or alkyl groups. In a preferred class of compounds R' and R" are alkyl groups of not over four carbon atoms each. These substituents are commonly methyl groups. This invention also relates to a method of preparing these ethers and to polymers and copolymers formed therefrom.

These compounds are useful as chemical intermediates, reacting at the vinyl group and/or at the isocyanate radical. For example, they react with ammonia to form carbamido derivatives which are useful resin formers. These ureido compounds combine with formaldehyde and give nitrogenous condensates useful in coating compositions.

The monomers of this invention are useful for imparting finishes to textiles of many types, since they react with cellulose, wool, silk, and other fibers to change their chemical nature and to introduce a polymerizable group. When Z is large, there are imparted to fibers water-resistant properties. They react with blood to give adhesives which can be polymerized in situ.

The isocyanatoalkyl vinyl ethers are prepared by heating a vinyloxyalkylcarbamate,

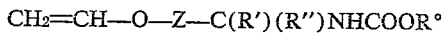

at a temperature from 170° to 300° C. in the presence of a fixed base, such as calcium oxide, potassium or sodium methoxide, potassium butoxide, potassium octoxide, sodium hydroxide, potassium hydroxide, sodium oxide, sodium or potassium acetate, sodium or potassium butyrate, barium oxide, or the like. As the isocyanatoalkyl vinyl ether is formed, it can be distilled.

Preparation of vinyloxyalkylcarbamates is described in detail in application Ser. No. 348,108 filed on even date. These are prepared by reacting an aminoalkyl vinyl ether of the formula

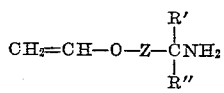

with an ester of a haloformic acid, XCOOR°, in the presence of an acceptor for hydrogen halide. Excess of the aminoalkyl vinyl ether, a tertiary amine such as pyridine, or a basic inorganic compound such as sodium bicarbonate, sodium or potassium carbonate, or sodium hydroxide may be so used. The reaction takes place between 0° and 100° C., preferably in the presence of an inert organic solvent such as benzene or toluene.

Typical of the compounds which are thus formed are ethyl N-(vinyloxy-tert.-butyl) carbamate, or the methyl, propyl, or butyl N-(vinyloxy-tert.-butyl) carbamates, dodecyl N-(vinyloxy-tert.-butyl) carbamate, benzyl N-(vinyloxy-tert.-butyl) carbamate, cyclohexyl N-(vinyloxy-tert.-butyl) carbamate, methyl N-(vinyloxy-2,2-dimethylpropyl) carbamate, ethyl N-(vinyloxy-1,3,3-trimethylpropyl) carbamate, ethyl N-(vinyloxy-4,4-dimethylbutyl) carbamate, ethyl N-(vinyloxy-3,7,7-trimethylheptyl) carbamate, allyl N-(vinyloxy-tert.-butyl) carbamate, octadecyl N-(vinyloxy-tert.-amyl) carbamate.

Polymerization of monomers of this invention is best accomplished under the influence of azo free radical catalysts. Normally about 0.05% to 2% of one of these is used based on the weight of monomer. Temperatures between 50° and 90° C. are generally effective.

The azo catalysts are compounds in which the —N=N— group is attached to aliphatic carbon atoms, at least one of which is tertiary. One of the carbon atoms bonded to the tertiary carbon atom has its remaining valences satisfied by at least one element from the class consisting of oxygen and nitrogen. Typical catalysts are azodiisobutyronitrile azodiisobutyramide, dimethyl, diethyl, or dibutyl azodiisobutyrate, azobis ($\alpha,\gamma$-dimethylvaleronitrile), azobis ($\alpha$-methylbutyronitrile), azobis ($\alpha$-methylvaleronitrile), dimethyl or diethyl azobismethylvalerate, and the like. These catalysts are also useful in preparing copolymers.

Copolymers are readily prepared from an isocyanatoalkyl vinyl ether and another vinylidene compound which is polymerizable with free radical catalysts. While polymerizable monovinylidene compounds are preferred, there may also be used polyvinylidene compounds. These, of course, cause cross-linking with its attendant effects. Useful free radical-polymerizable vinylidene comonomers include acrylates, methacrylates, acrylonitrile, methacrylonitrile, acrylamides, methacrylamides, styrene, vinyl esters, etc.

The following illustrative examples show specific preparations with additional details. Parts are by weight.

Example 1

A solution is prepared of 575 parts of 2-aminoisobutyl vinyl ether in 880 parts of dry benzene. To this solution, while it is stirred and cooled, there is slowly added over a two hour period 271 parts of ethyl chlorocarbonate. The temperature during this time is held between 0° and 10° C. The reaction is stirred for another 1.5 hours and filtered to remove amine hydrochloride. This salt is rinsed with benzene and dried in vacuo. The benzene filtrate is washed with cold, saturated sodium bicarbonate solution, dried over magnesium sulfate, and filtered. Benzene is taken off under reduced pressure to yield an oil, which is distilled to give 367 parts of ethyl N-(vinyloxy-tert.-butyl) carbamate. This product distills at 70° C./1.2 mm. or 55° C./0.4 mm. It has a refractive index, $N_D^{25}$, of 1.4475.

This compound is useful as an insecticidal agent, being a stomach poison and also having contact action. It was compounded into a 5% dust which was applied to bean plants infested with bean beetle larvae. It gave a 100% kill after 24 hours. A spray was prepared with the above compound diluted 1:400. This was applied against aphids on bean plants. At 24 hours the kill was 74%. There was no foliage injury.

There are mixed 37 parts of ethyl N-(vinyloxy-tert.-butyl) carbamate, 1.5 parts of calcium oxide, and 0.75 part of potassium octoxide. The mixture is stirred and heated. When the temperature reaches about 190° C., distillation begins and continues with the pot temperature at 190°–195° C. The distillate is dissolved in petroleum ether. The resulting solution is washed five times with small portions of water. It is then dried over sodium sulfate and concentrated. The product is distilled at 62° C./25 mm. to give a 48% yield of 2-isocyanatoisobutyl vinyl ether. The product thus obtained has the following analysis: carbon, 59.2%; hydrogen, 7.82%; and nitrogen, 9.9%; "neutral equivalent," 142. Corresponding theoretical values are 59.5%, 7.80%, 9.93%, and 141 respectively. The term "neutral equivalent" is here used to mean a value obtained by addition of excess amine such as benzylamine to the product and determination of unreacted amine by titration with standard acid.

The compound 2-isocyanatoisobutyl vinyl ether is useful as an insecticidal agent, acting as a stomach poison. A 5% dust gives a 75% kill of bean beetle larvae.

The above procedure was repeated with substitution for the mixture of calcium oxide and potassium octoxide or other catalysts, potassium or sodium methylate, barium oxide and potassium octoxide, and potassium metal. In every case, there was isolated 2-isocyanatoisobutyl vinyl ether.

This compound readily reacts with ammonia to form carbamido compounds. For example, a portion of isocyanatoisobutyl vinyl ether is treated with ammonium hydroxide solution in excess. The resultant solid is recrystallized from water. It then melts at 118°–120° C. and corresponds in composition to 2-ureidoisobutyl vinyl ether, a highly useful monomer for forming resins which find use in coatings, particularly in modifying acrylic resins. The monomers having small R' and R" groups and alkylene chains of two to three carbon atoms between oxygen and nitrogen are useful as reactants with compounds containing reactive hydrogen, such as wool, cotton, rayon, polyamine resins, alkyd resins, or polyvinyl alcohol resins, to introduce polymerizable groups, which serve to cross-link and insolubilize.

*Example 2*

There are mixed 33 parts of dodecyl N-(vinyloxy-tert.-butyl) carbamate, two parts of calcium oxide, and two parts of potassium butoxide. The mixture is stirred and heated to pot temperatures of 190°–200° C. with distillation of product through a short column. This is taken off at 145°–150° C. head temperature. It corresponds closely in composition to 2-isocyanatoisobutyl vinyl ether.

*Example 3*

A portion of five parts of distilled 2-isocyanatoisobutyl vinyl ether is mixed with one part of dimethylformamide as solvent and 0.05 part of dimethyl azodiisobutyrate as catalyst. The mixture is heated at 75° C. for 16 hours under a nitrogen atmosphere. The mixture is then heated under reduced pressure to yield three parts of a white solid. This is a polymer of isocyanatoisobutyl vinyl ether. It is insoluble in water, but readily soluble in benzene, acetone, and alcohol.

When a toluene solution of the polymer is treated with iminobispropylamine, a gel results immediately. When an acetone solution of the polymer is treated with dimethylaminopropylamine, a polyureido compound results, dimethylaminopropylurea groups being formed. This compound is insoluble in water but is soluble in dilute acids.

The polymer is useful as a textile finishing agent, in particular for stabilizing wool. The polymer is useful as an additive for cellulose acetate dopes. When films or fibers are formed from thus treated dopes, they can be heat-treated to render the films or fibers highly resistant to the action of solvents. The action of these additives also improves tensile strength. In a comparable manner the polymers can be used in thermosetting coatings to increase solvent resistance. They may be mixed with alkyd resins, a polyfunctional acid such as adipic, and an acid catalyst to provide cross-linking in heat-treated films.

Polymerization is conveniently carried out in the presence of an organic solvent such as dimethylformamide or aromatic hydrocarbon.

*Example 4*

A solution is prepared from 1.4 parts of 2-isocyanatoisobutyl vinyl ether, nine parts of methyl methacrylate, and 24 parts of toluene. The solution is treated with 0.1 part of dimethyl azodiisobutyrate and heated at 80° C. for 24 hours. The solution then has a Gardner-Holdt viscosity of A–1 and a color of 0 (Varnish Scale). A portion of this solution treated with a little iminobispropylamine increases in viscosity to E+, but no gel results. The product is a copolymer of methyl methacrylate and isocyanatoisobutyl vinyl ether. It is useful as a thermosetting coating at elevated temperatures (150° C.).

In place of the above methyl methacrylate, there may be substituted other methacrylates, such as ethyl, isopropyl, butyl, tert.-butyl, or tert.-amyl with formation in each case of a copolymer useful for coating. Also in place of the above methyl methacrylate there may be used a mixture of methyl methacrylate and ethyl, propyl, or butyl acrylate. In one formulation there are used 1.4 parts of 2-isocyanatoisobutyl vinyl ether, five parts of methyl methacrylate, and four parts of ethyl acrylate. The solution in toluene is treated with an azo catalyst at 75°–80° C. to yield a solution of copolymer useful as a coating which can be thermoset.

When an isocyanatoalkyl vinyl ether forms a minor proportion of the mixture of monomers, the free radical catalyst may effectively be a peroxide catalyst, such as benzoyl peroxide, caproyl peroxide, methyl ethyl ketone peroxide, tert.-butyl hydroperoxide, or butyl perbenzoate, or in aqueous systems a catalyst such as ammonium, sodium, or potassium persulfate.

*Example 5*

There are mixed 20 parts of acrylonitrile, 60 parts of ethyl acrylate, 20 parts of 2-isocyanatoisobutyl vinyl ether, and 300 parts of water containing 12 parts of sodium octylphenoxyethoxyethoxyethyl sulfonate. The mixture is treated with 1.2 parts of ammonium persulfate and two parts of sodium hydrosulfite. In a short time copolymerization begins and the temperature rises. A dispersion of copolymer is thus obtained which is useful in textile finishing baths.

*Example 6*

A solution is prepared from two parts of 2-isocyanatoisobutyl vinyl ether, eight parts of butyl acrylate, and 25 parts of toluene. This solution is copolymerized under a nitrogen atmosphere at 75° C. to ten hours with the aid of 0.15 part of dimethyl azodiisobutyrate. A viscous solution is formed. The same mixture is prepared and treated with 0.1 part of benzoyl peroxide at about 100° C. A viscous solution of copolymer is likewise formed.

*Example 7*

There are mixed 50 parts of methyl, 2-vinyloxy-4-methyl-4-pentyl-carbamate, $$CH_2=CH-O-CH(CH_3)CH_2C(CH_3)_2NHCOOCH_3$$

one part of potassium octoxide, and two parts of calcium oxide. The mixture is stirred and heated to about 200° C. with evolution of vapors. The product is taken off under reduced pressure, and dissolved in petroleum ether. This solution is washed with water, dried over calcium sulfate, and concentrated. The residue corresponds in composition to 2-vinyloxy-4-methyl-4-pentylisocyanate.

Even though the monomers of this invention are readily converted to polymers and the polymers are readily thermoset, the monomers, nevertheless, are exceedingly stable at moderate temperatures when stored in closed containers, requiring no special inhibitors or refrigeration.

Polymers formed from vinyloxy-tert.-alkylisocyanates have a long shelf-life, which would not be anticipated from the behavior of other isocyanates. They are surprisingly insensitive to deterioration from moisture or traces of alcohol.

A distinguishing characteristic of vinyloxyalkylisocyanates, in which the alkyl group has a chain of four or more carbon atoms between oxygen and nitrogen, is that when copolymers are formed therewith, the isocyanate groups have a peculiarly efficient cross-linking capacity. This is due to the chain length or the separation of the isocyanate groups from the vinyl linkages. When the isocyanate is attached directly to the polymer chain, or separated by only a short chain, the isocyanate group is not free to so react, requiring a much higher proportion of isocyanate to effect useful cross-linking.

While the compounds of this invention are vinyl ethers, they have distinctive properties which are surprisingly different from those of previously known vinyl ethers. The vinyl alkyl ethers, for example, require acid catalysts for polymerization and are scarcely affected by free radical catalysts. Here acid catalysts are undesirable and surprisingly azo catalysts become effective.

We claim:

1. A compound of the formula

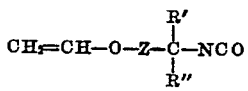

wherein Z is an alkylene group of not over seven carbon atoms, R' and R" are alkyl groups of not over 4 carbon atoms when Z is an alkylene chain of not over two carbon atoms, and R' and R" are members of the class consisting of hydrogen and alkyl groups of not over 4 carbon atoms when Z is an alkylene chain of more than two carbon atoms.

2. An addition polymer of a compound of claim 1.

3. A compound of the formula

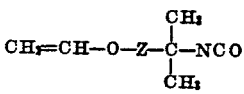

wherein Z is an alkylene chain of not over seven carbon atoms.

4. The compound of the formula

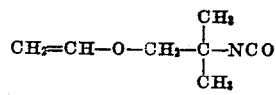

5. A polymer of the compound of claim 4.

6. An addition copolymer of a compound of the formula

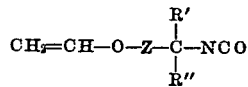

wherein Z is an alkylene group of not over seven carbon atoms, R' and R" are alkyl groups of not over 4 carbon atoms when Z is an alkylene chain of not over two carbon atoms, and R' and R" are members of the class consisting of hydrogen and alkyl groups of not over 4 carbon atoms when Z is an alkylene chain of more than two carbon atoms, and another copolymerizable monovinylidene compound.

7. An addition polymer of a compound of the formula

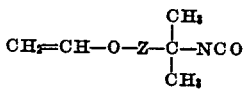

wherein Z is an alkylene chain of not over seven carbon atoms.

8. An addition copolymer of the compound

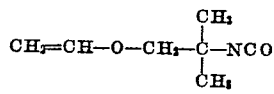

and at least one other copolymerizable monovinylidene compound.

References Cited in the file of this patent

UNITED STATES PATENTS

| | | |
|---|---|---|
| 2,334,476 | Coffman | Nov. 16, 1943 |
| 2,647,884 | Wystrach | Aug. 4, 1953 |